United States Patent
Yamada

(10) Patent No.: US 8,594,434 B2
(45) Date of Patent: Nov. 26, 2013

(54) DEVICE, METHOD, AND COMPUTER-READABLE STORAGE MEDIUM FOR SEGMENTATION OF AN IMAGE

(75) Inventor: Hideshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 13/177,809

(22) Filed: Jul. 7, 2011

(65) Prior Publication Data

US 2012/0020528 A1    Jan. 26, 2012

(30) Foreign Application Priority Data

Jul. 23, 2010  (JP) ................ P2010-166195

(51) Int. Cl.
*G06K 9/00*     (2006.01)
(52) U.S. Cl.
USPC ................ 382/190; 715/247; 348/135
(58) Field of Classification Search
USPC ......... 382/100, 181, 190, 195, 199, 143, 166, 382/203, 254, 256, 257, 266; 715/247; 348/135
See application file for complete search history.

(56) References Cited

U.S. PATENT DOCUMENTS

| | | | | |
|---|---|---|---|---|
| 5,559,901 A | * | 9/1996 | Lobregt | 382/256 |
| 6,111,983 A | * | 8/2000 | Fenster et al. | 382/203 |
| 6,574,353 B1 | * | 6/2003 | Schoepflin et al. | 382/103 |
| 6,920,248 B2 | * | 7/2005 | Higaki | 382/199 |
| 7,400,767 B2 | * | 7/2008 | Slabaugh et al. | 382/173 |
| 7,660,463 B2 | * | 2/2010 | Blake et al. | 382/173 |
| 7,876,937 B2 | * | 1/2011 | Schildkraut et al. | 382/128 |
| 2004/0184646 A1 | * | 9/2004 | Oosawa | 382/128 |
| 2008/0170791 A1 | * | 7/2008 | Eskildsen et al. | 382/199 |

OTHER PUBLICATIONS

Rother, C. et al., "GrabCut: Interactive Foreground Extraction Using Iterated Graph Cuts," ACM Transactions on Graphics, vol. 23, No. 3, pp. 309-314, (2004).

* cited by examiner

*Primary Examiner* — Anand Bhatnagar
(74) *Attorney, Agent, or Firm* — Finnegan Henderson Farabow Garrett & Dunner LLP

(57) ABSTRACT

An image processing apparatus includes an obtaining unit obtaining an image including a closed curve input which encloses an object in an input image, a generation unit generating a distance image having pixel values of individual pixels corresponding to distances from the input closed curve in accordance with a shape of the curve, a calculation unit calculating an input-image energy of the input image including a distance energy changed based on the distances of the pixels or a likelihood energy changed based on likelihoods of the pixels based on color distribution models of an object region and a non-object region in the distance image and a color energy changed in accordance with color differences between adjacent pixels in the distance image, and a generation unit generating a mask image by minimizing the input-image energy and assigning an attribute representing the object region or an attribute representing the non-object region.

12 Claims, 11 Drawing Sheets

DEVICE, METHOD, AND COMPUTER-READABLE STORAGE MEDIUM FOR SEGMENTATION OF AN IMAGE

BACKGROUND

The present disclosure relates to image processing apparatuses, image processing methods, and programs, and particularly relates to an image processing apparatus, an image processing method, and a program which enable to generate a distance image in accordance with a shape of a closed curve input so as to enclose an object and calculate energy to thereby improve performance of a function of assigning features used to distinguish pixels which belong to the object from pixels which do not belong to the object.

In a field of image processing, a segmentation process of separating an image into an object (foreground) and a background has been considered as one of important functions, and various researches have been performed.

This segmentation process realizes a process of selecting a portion of an image to be subjected to a specific process and a process of extracting a portion of an image as an object to be synthesized with another image.

Examples of the effective segmentation process in which one of two attributes (labels), i.e., an object and a background, is assigned to each pixel of an image include a grabcut method (refer to "GrabCut: interactive foreground extraction using iterated graphcuts" Carsten Rother, Vladimir Kolmogorov, Andrew Blake ACM Transactions on Graphics, 23(3), August 2004, pp. 309-314 and U.S. Pat. No. 7,660,463)

In this method, first, a user specifies a rectangular line or a closed curve which surrounds an object to be extracted. As an algorithm, in an initial state, an outside of the rectangular line is determined to include pixels of a background and an inside is determined to include a mixture of pixels of an object and pixels of the background.

The segmentation process is repeatedly performed using two information items including likelihoods of individual pixels and continuities obtained by color differences among the pixels with reference to a color distribution model of the object and a color distribution model of the background while the color distribution models are updated so that pixels representing the object are determined.

The likelihoods of the individual pixels and the color differences among the pixels are obtained as graph data representing an energy which is to be subjected to energy minimization calculation so that a pixel aggregate of the object is obtained.

The energy used for the minimization calculation corresponds to the likelihoods of the individual pixels and the color differences among pixels, and the input closed curve is only used for attribute categorization for the pixels in which the pixels are categorized into the foreground and the background in the initial state.

Since the closed curve is input so as to surround an outer circumference of the object, it is highly likely that the closed curve is similar to a final shape of the object, and therefore, the closed curve is important information to be positively utilized.

As a simple method for addressing this matter, a method for shrinking the input closed curve inward by a predetermined width such that a boundary between the object and the background is included in a band region defined by the input closed curve and the shrunk closed curve has been considered.

In general, an operation performed for the shrinkage by a desired width is referred to as "Erosion", and a method for performing segmentation using this method has been proposed (refer to U.S. Pat. No. 7,400,767).

SUMMARY

However, in this method, a shrinkage process is uniformly performed irrespective of shapes and positions.

Therefore, in order to finally obtain the boundary included in the band region, a wide width which is efficient for absorbing variation of a distance between the input closed curve and a shape of a contour should be ensured or a process is repeatedly performed to obtain the contour, and accordingly, the method is not effective.

Accordingly, it is desirable to improve accuracy of a result of a segmentation process by obtaining a distance image corresponding to a shape of an input closed curve using information on the input closed curve so that an energy calculation in a segmentation process is performed additionally using information on the input shape.

According to an embodiment of the present disclosure, there is provided an image processing apparatus including an input-closed-curve-image obtaining unit obtaining an image including a closed curve input so as to enclose an object included in an input image, a distance-image generation unit generating a distance image having pixel values set for individual pixels so as to correspond to distances from the input closed curve in accordance with a shape of the input closed curve, an energy calculation unit calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and a mask-image generation unit generating a mask image by performing calculation so that the input-image energy is minimized and assigning, in accordance with the minimized input-image energy, an attribute representing the object region of the input image or an attribute representing the region other than the object region.

The distance-image generation unit may obtain an intermediate axis in an inner portion relative to the input closed curve by calculation, obtain the distances of the pixels by performing internal division on distances between the internal axis and the input closed curve relative to positions of the pixels, and generate the distance image having the pixel values set to the individual pixels in accordance with the distances.

The distance-image generation unit may calculate the intermediate axis by performing a thinning process on a shape of the inner portion of the input closed curve in a binary image obtained by performing binarization on the input image to obtain the inner portion and an outer portion.

The distance-image generation unit may perform morphing deformation on an inner portion relative to the input closed curve so that the shape of the input closed curve becomes a circle, obtain the distances of the pixels in accordance with distances from positions to which the pixels are moved after the morphing deformation to the deformed input closed curve, and generate the distance image having the pixel values ser for individual pixels in accordance with the distances.

The distances of the pixels included in the distance image may be obtained by integrating differences of feature values associated with the pixels, the feature values including differences of luminance or colors R, G, and B and differences of the likelihoods.

The distances of the pixels included in the distance image may be spatial distances on paths set between a pixel located in a reference position and pixels located in positions included in the input closed curve.

The energy calculation unit may calculate the color distribution models by weighting colors of the pixels in accordance with the distances of the pixels included in the distance image and calculate the energy in accordance with the color distribution models.

The energy calculation unit may increase or reduce the energy calculated using the colors of the pixels in accordance with values of the distances of the pixels included in the distance image.

The energy calculation unit may increase or reduce the energy calculated using the color differences among the pixels in accordance with values of the distances of the pixels included in the distance image.

The energy calculation unit may calculate orientations of the distances of the pixels included in the distance image and increase or reduce the energy in accordance with angle differences between the orientations and a direction of connection of the pixels.

According to another embodiment of the present disclosure, there is provided an image processing method of an image processing apparatus including an input-closed-curve-image obtaining unit obtaining an image including a closed curve input so as to enclose an object included in an input image, a distance-image generation unit generating a distance image having pixel values set for individual pixels so as to correspond to distances from the input closed curve in accordance with a shape of the input closed curve, an energy calculation unit calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and a mask-image generation unit generating a mask image by performing calculation so that the input-image energy is minimized and assigning, in accordance with the minimized input-image energy, an attribute representing the object region of the input image or an attribute representing the region other than the object region. The image processing method including obtaining, using the input-closed-curve-image obtaining unit, an image including a closed curve input so as to enclose an object included in an input image, generating, using the distance-image generation unit, a distance image having pixel values set for individual pixels so as to correspond to distances from the input closed curve in accordance with a shape of the input closed curve, calculating, using the energy calculation unit, an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and generating, using the mask-image generation unit, a mask image by performing calculation so that the input-image energy is minimized and assigning, in accordance with the minimized input-image energy, an attribute representing the object region of the input image or an attribute representing the region other than the object region.

According to a further embodiment of the present disclosure, there is provided a program which causes a computer controlling an image processing apparatus including an input-closed-curve-image obtaining unit obtaining an image including a closed curve input so as to enclose an object included in an input image, a distance-image generation unit generating a distance image having pixel values set for individual pixels so as to correspond to distances from the input closed curve in accordance with a shape of the input closed curve, an energy calculation unit calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and a mask-image generation unit generating a mask image by performing calculation so that the input-image energy is minimized and assigning, in accordance with the minimized input-image energy, an attribute representing the object region of the input image or an attribute representing the region other than the object region, to execute a process including obtaining, using the input-closed-curve-image obtaining unit, an image including a closed curve input so as to enclose an object included in an input image, generating, using the distance-image generation unit, a distance image having pixel values set for individual pixels so as to correspond to distances from the input closed curve in accordance with a shape of the input closed curve, calculating, using the energy calculation unit, an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and generating, using the mask-image generation unit, a mask image by performing calculation so that the input-image energy is minimized and assigning, in accordance with the minimized input-image energy, an attribute representing the object region of the input image or an attribute representing the region other than the object region.

According to a still further embodiment of the present disclosure, there is provided an image processing apparatus, including obtaining an image including a closed curve input so as to enclose an object included in an input image, generating a distance image having pixel values set for individual pixels so as to correspond to distances from the input closed curve in accordance with a shape of the input closed curve, calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and generating a mask image by performing calculation so that the input-image energy is minimized and assigning, in accordance with the minimized input-image energy, an attribute representing the object region of the input image or an attribute representing the region other than the object region.

The image processing apparatus of the present disclosure may be independently provided or may be blocks which perform image processing.

Accordingly, an excellent segmentation result may be obtained.

DETAILED DESCRIPTION OF EMBODIMENTS

Figure 1:
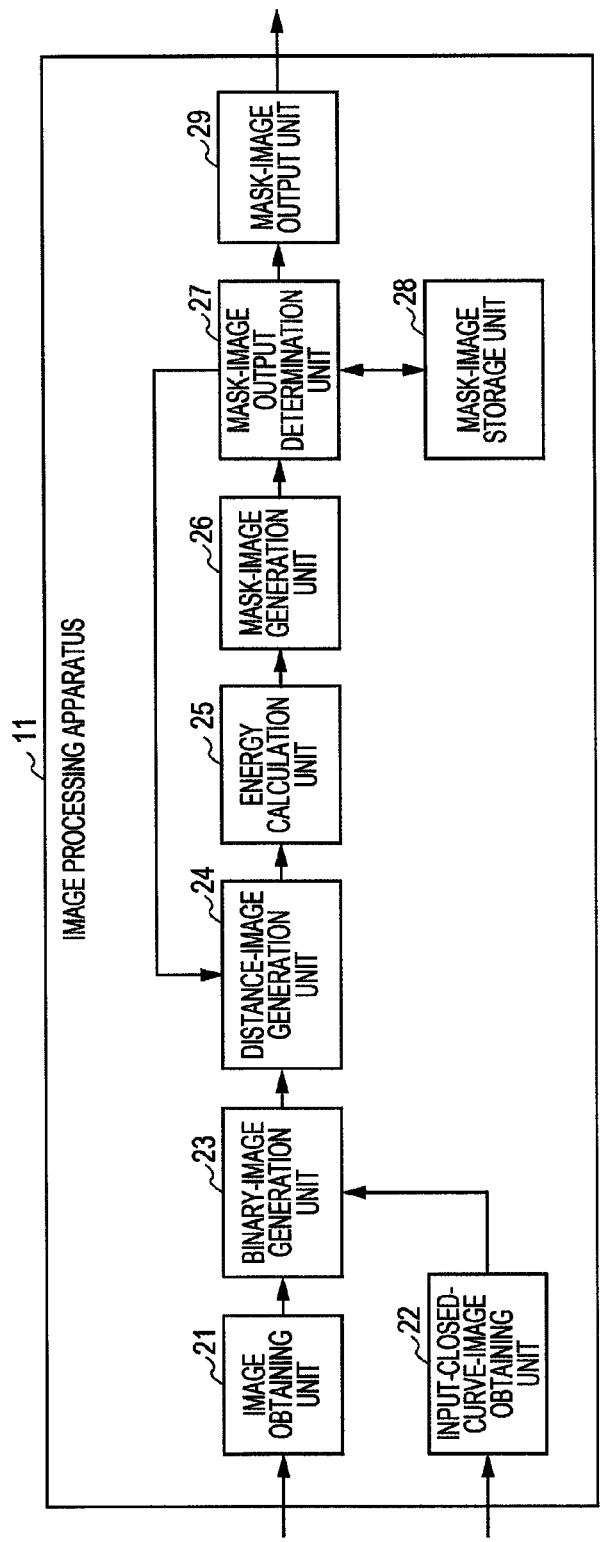
FIG. 1 is a block diagram illustrating a configuration of an image processing apparatus according to an embodiment of the present disclosure.
Figure 2:
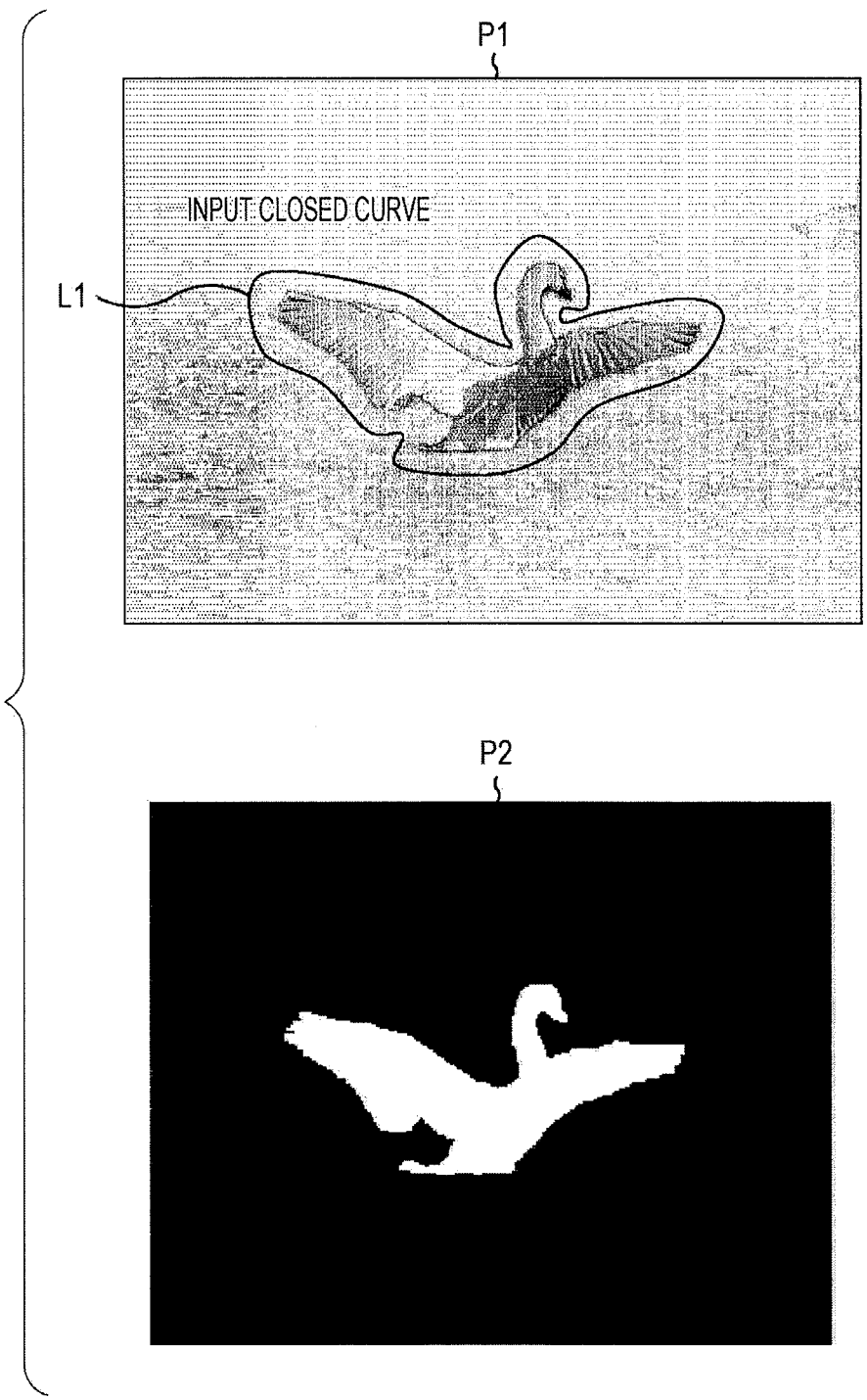
FIG. 2 includes diagrams illustrating a process performed by the image processing apparatus shown in FIG. 1.

Embodiments of the present disclosure will be described hereinafter. Note that the description will be made in the following order.
1. First Embodiment
2. Second Embodiment
1. First Embodiment
Example of Configuration of Image Processing Apparatus FIG. 1 shows a configuration of hardware of an image processing apparatus according to an embodiment of the present disclosure. An image processing apparatus 11 shown in FIG. 1 generates, for example, a mask image P2 shown in FIG. 2 using an input image P1 shown in FIG. 2 and an image of a closed curve L1 input along a contour of an object (an image of a swan) which is a foreground in the input image P1. Pixels included in the mask image P2 have attributes assigned thereto representing whether the individual pixels belong to an object region (foreground region) or a non-object region (background region). In the mask image P2 shown in FIG. 2, pixels which belong to the object region are represented by white and pixels which belong to the background region are represented by black. That is, the image processing apparatus 11 obtains attributes of the individual pixels representing whether the pixels belong to the object region or the other region using the input image and the image of the closed curve input along the contour of the object included in the input image and outputs the attributes as a mask image. Such a process performed by the image processing apparatus 11 is generally referred to as a segmentation process.

The image processing apparatus 11 includes an image obtaining unit 21, an input-closed-curve-image obtaining unit 22, a binary-image generation unit 23, a distance-image generation unit 24, an energy calculation unit 25, a mask-image generation unit 26, a mask-image output determination unit 27, a mask-image storage unit 28, and a mask-image output unit 29.

The image obtaining unit 21 obtains an input image of RGB (Red, Green, and Blue) and supplies the input image to the binary-image generation unit 23.

The input-closed-curve-image obtaining unit 22 obtains an image formed by a closed curve input along a contour of an object included in the input image. The closed curve may be input by a user by operating an operation unit, not shown, while viewing the input image. Alternatively, the closed curve may be input in accordance with information recognized using a technique proposed as an object recognition technique. Note that, as an example of the technique of recognizing an object in an input image is proposed in "Learning to Detect A Salient Object", Tie Liu, Jian Sun, Nan-Ning Zheng, Xiaoou Tang, and Heung-Yeung Shum, Computer Vision and Pattern Recognition, 2007. CVPR '07. IEEE Conference on Publication Date: 17-22 Jun. 2007.

The binary-image generation unit 23 generates a binary image including an outer region which is located outside the input closed curve and which includes the input closed curve in the input-closed-curve image and an inner region which is located inside the input closed curve and which does not include the input closed curve, the outer and inner regions being represented by binary pixel values, and supplies the binary image to the distance-image generation unit 24.

The distance-image generation unit 24 obtains values of pixels included in the input closed curve of the binary image supplied from the binary-image generation unit 23 or the mask-image output determination unit 27, the values corresponding to distances from the input closed curve to the pixels, generates a distance having pixel values which are proportional to the obtained values, and supplies the distance image to the energy calculation unit 25. Note that, a configuration of the distance-image generation unit 24 will be described in detail hereinafter with reference to FIG. 3.

The energy calculation unit 25 obtains an energy of the input image using likelihoods of the individual pixels and color differences among the pixels on the basis of the distance image, and supplies the energy to the mask-image generation unit 26. Note that the color differences among the pixels include luminance differences, differences of colors R, G, and B, and differences of the likelihoods.

The mask-image generation unit 26 generates a weighted graph in accordance with the energy of the input image and optimizes the weighted graph, and thereafter, generates a mask image in accordance with a result of the optimization to be supplied to the mask-image output determination unit 27.

The mask-image output determination unit 27 causes the mask-image storage unit 28 to store the currently-supplied mask image, obtains a difference between a mask image which has been stored in a preceding process and the currently-supplied mask image, and returns the supplied mask image to the distance-image generation unit 24 when the difference is larger than a predetermined value. On the other hand, the mask-image output determination unit 27 supplies the input mask image to the mask-image output unit 29 which outputs the mask image when the difference between the mask image which has been stored in the preceding process and the currently-supplied mask image is smaller than the predetermined value.

Configuration of Distance-Image Generation Unit

Figure 3:
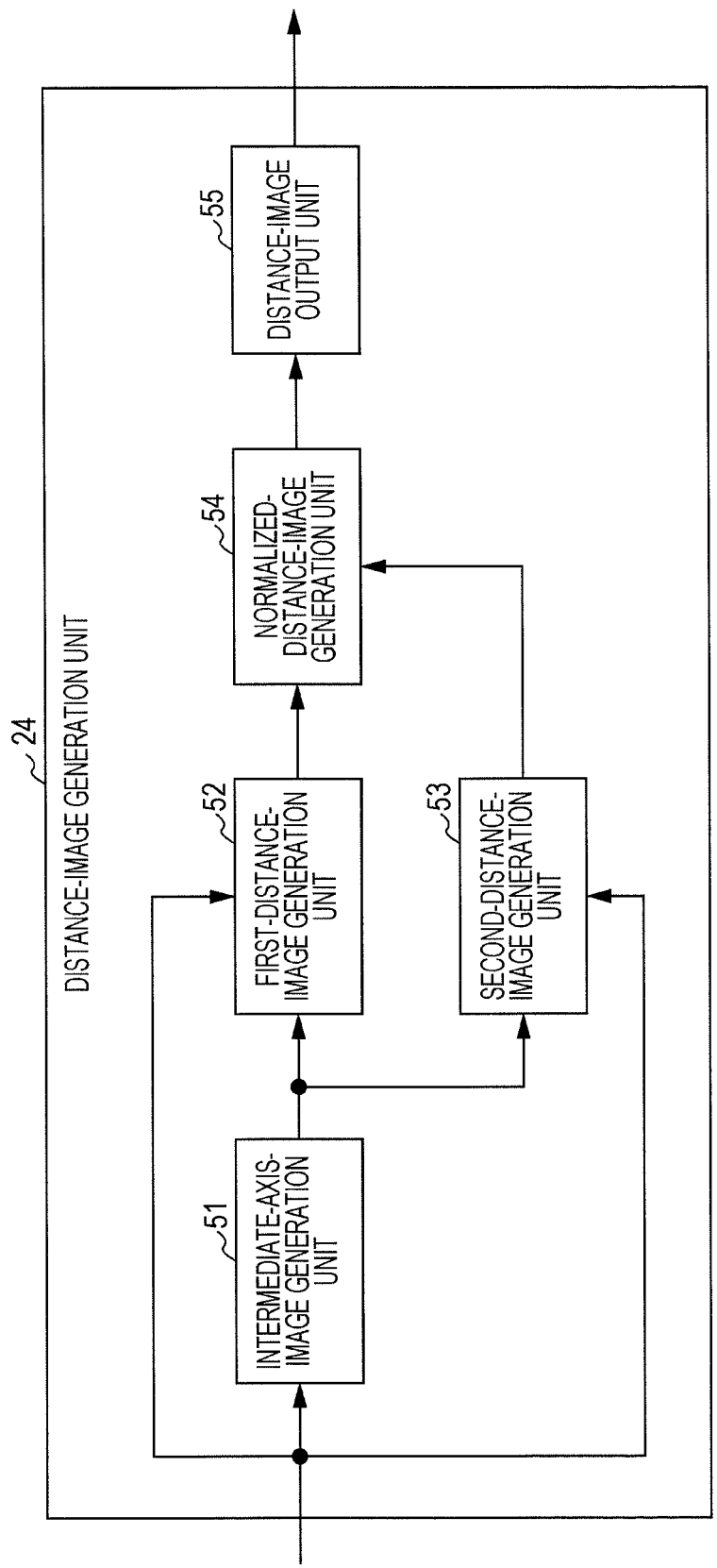
FIG. 3 is a diagram illustrating a configuration of a distance-image generation unit.

A configuration of the distance-image generation unit 24 will now be described with reference to FIG. 3.

The distance-image generation unit 24 includes an intermediate-axis-image generation unit 51, a first-distance-image generation unit 52, a second-distance-image generation unit 53, a normalized-distance-image generation unit 54, and a distance-image output unit 55.

The intermediate-axis-image generation unit 51 performs a thinning process on a shape included in the input closed curve in the binary image supplied from the binary-image generation unit 23 and generates an intermediate axis image to be supplied to the first-distance-image generation unit 52 and the second-distance-image generation unit 53.

The first-distance-image generation unit 52 sequentially sets shortest paths from pixels on a boundary corresponding to the input closed curve to pixels included in the intermediate axis image. Then, the first-distance-image generation unit 52 sets distances of the pixels located on the boundary and located on the paths to 0 and successively obtains shortest distances to the pixels included in the intermediate axis for individual pixels in a direction toward the intermediate axis such that 1 is added to pixels which are vertically adjacent to each other and √2 is added to pixels which are diagonally adjacent to each other. Furthermore, the first-distance-image generation unit 52 generates a first distance image having pixel values corresponding to distances obtained for individual pixels as described above and supplies the first distance image to the normalized-distance-image generation unit 54.

The second-distance-image generation unit 53 sets shortest paths from the pixels included in the intermediate axis to the pixels located on the boundary corresponding to the input closed curve. Then, the second-distance-image generation unit 53 sets distances of the pixels located on the boundary and located on the path to 0 and successively obtains shortest distances to the pixels included in the intermediate axis for individual pixels in a direction toward the input closed curve serving as the boundary such that 1 is added to pixels which are vertically adjacent to each other and √2 is added to pixels which are diagonally adjacent to each other. Furthermore, the second-distance-image generation unit 53 generates a second distance image having pixel values corresponding to the distances obtained for individual pixels as described above and supplies the second distance image to the normalized-distance-image generation unit 54.

The normalized-distance-image generation unit 54 performs internal division on the first distance image supplied from the first-distance-image generation unit 52 and the second distance image supplied from the second-distance-image generation unit 53 as results, normalizes the distances, and generates a normalized distance image to be output to the distance-image output unit 55.

The distance-image output unit 55 outputs the normalized distance image supplied from the normalized-distance-image generation unit 54 as a distance image generated by the distance-image generation unit 24.

Segmentation Process

Figure 4:
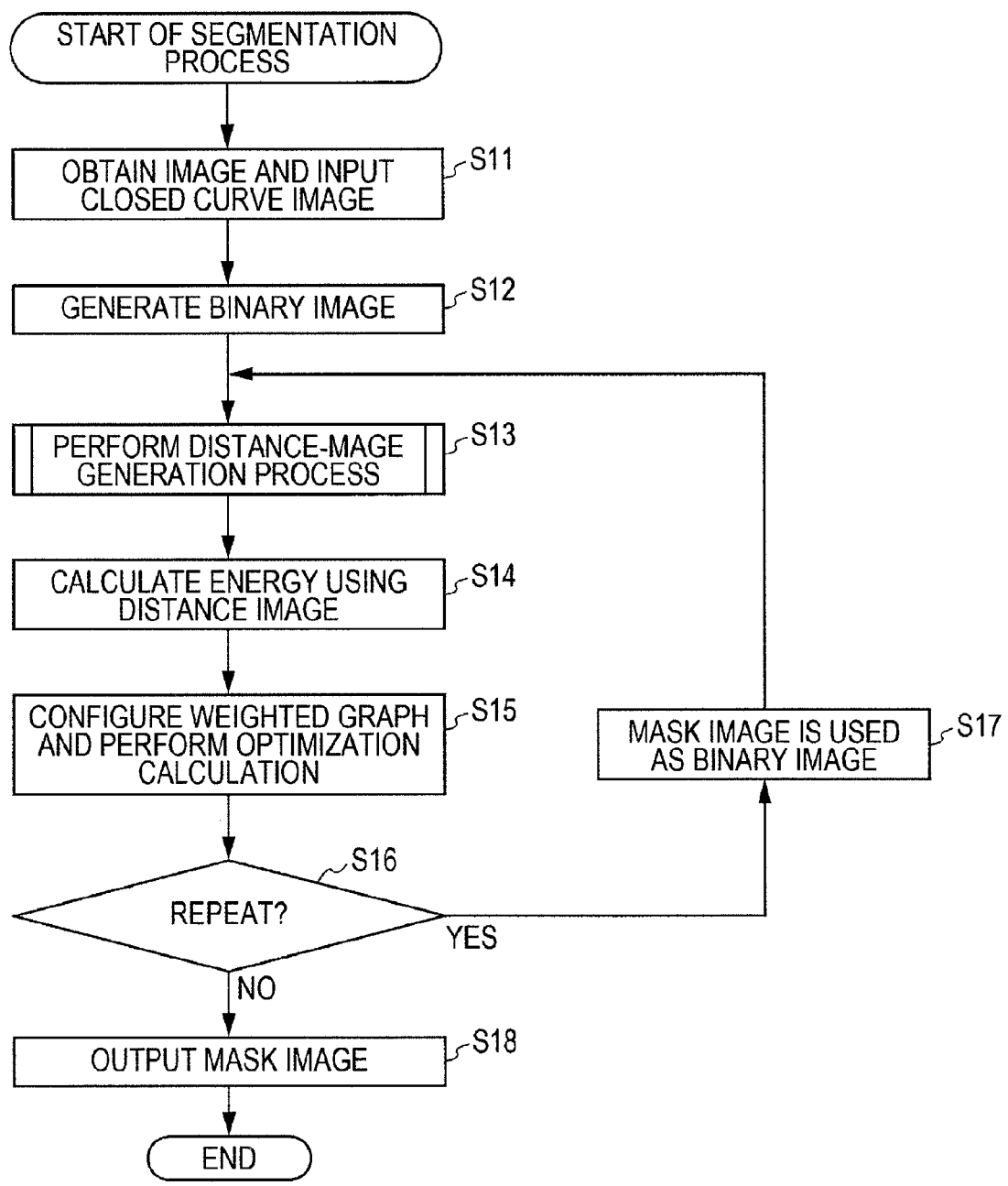
FIG. 4 is a flowchart illustrating a segmentation process.

Next, a segmentation process which is an image process performed by the image processing apparatus 11 shown in FIG. 1 will be described with reference to a flowchart shown in FIG. 4. Note that, in this segmentation process, it is assumed that an input closed curve image obtained by inputting a closed curve in an outer peripheral portion of an object which has been obtained from an input image through an object searching process not shown or an input closed curve image obtained by inputting a closed curve such that an outer peripheral portion of an object included in an input image is traced by a user's operation using an operation unit not shown is supplied together with the input image.

In step S11, the image obtaining unit 21 obtains an input image and the input-closed-curve-image obtaining unit 22 obtains an input closed curve image. Then, the image obtaining unit 21 supplies the obtained input image to the binary-image generation unit 23. Furthermore, the input-closed-curve-image obtaining unit 22 supplies the obtained input closed curve image to the binary-image generation unit 23.

Figure 5:
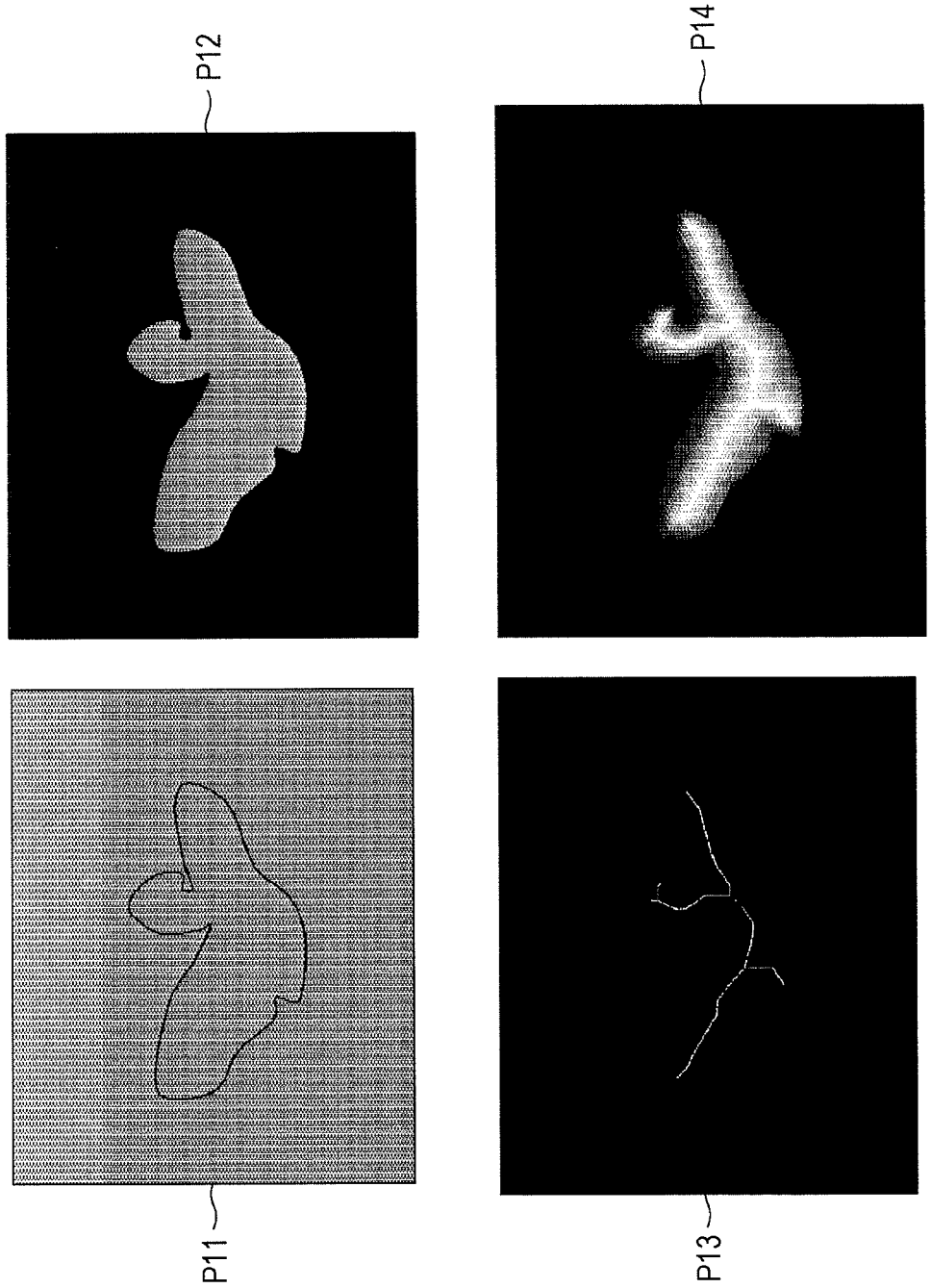
FIG. 5 includes diagrams illustrating the segmentation process.

In step S12, the binary-image generation unit 23 generates a binary image including first pixel values included in the input closed curve image including the object and second pixel values included in other regions in accordance with the supplied input image and the supplied input closed curve image, and supplies the binary image to the distance-image generation unit 24. For example, it is assumed that, when a closed curve image represented by an image P11 shown in FIG. 5 is input, the binary-image generation unit 23 generates a binary image represented by an image P12. Note that, when pixel values are included in a range from 0 to 255, the image P11 shown in FIG. 5 includes an input closed curve L1 (shown in FIG. 2) having pixel values of 0 and another region having pixel values of 128. On the other hand, the binary image has a region including the closed curve L1 and inside the closed curve L1 having pixel values of 128 and another region having pixel values of 0.

In step S13, the distance-image generation unit 24 executes a distance-image generation process so as to generate a distance image from the binary image and supplies the distance image to the energy calculation unit 25. Specifically, the distance-image generation unit 24 generates a distance image represented by an image P14 shown in FIG. 5 through the distance-image generation process performed on the binary image P12 shown in FIG. 5. Note that the distance-image generation process will be described in detail hereinafter with reference to a flowchart shown in FIG. 6.

In step S14, the energy calculation unit 25 calculates an energy of the input image using the distance image. Here, the energy calculation unit 25 calculates an energy E(X) represented by Expression (1) below and supplies the energy E(X) to the mask-image generation unit 26. Note that the energy E(X) represented by Expression (1) is obtained by expanding an energy calculation formula disclosed in U.S. Pat. No. 7,660,463.

$$E(X) = \Sigma E\_1(xi) + \lambda \Sigma E\_2(xi, xj) \tag{1}$$

Here, X denotes an aggregate of pixel values x. Furthermore, $E\_1(xi)$ and $E\_2(xi, xj)$ in Expression (1) are defined by Expressions (2) and (3) below, respectively.

$$E\_1(xi) = S(xi) + M(xi) + D(xi) \tag{2}$$

$$E\_2(xi, xj) = T(xi, xj) \tag{3}$$

Furthermore, $S(xi)$ included in Expression (2) denotes an energy applied to a pixel xi corresponding to an input seed of 1 and is defined as represented by Expression (4) below.

$$S(xi) = +\infty \text{ or } -\infty \text{ or } 0 \tag{4}$$

Specifically, S(xi) is an energy applied to a pixel xi in a position of the input seed, −∞ is applied to pixels having pixel values of 0, +∞ is applied to pixels having pixel values of 255, and 0 is applied to other pixels in the binary image. Here, the input seed is a restraint condition for the segmentation process and expressly specifies attributes representing a background or an object for individual pixels. For example, the pixel values of 0 represent the background region in the binary image, pixel values of 255 represent the object region in the binary image, and other regions are determined as suspensive regions to be subjected to an automatic attribute calculation.

Furthermore, M(xi) in Expression (2) which represents energies of likelihoods of individual pixels obtained on the basis of color distribution models is defined by Expression (5) below and is included in a range from −1.0 to 1.0.

$$M(xi)=(Pf(C(xi))-Pb(C(xi)))/(Pf(C(xi))+Pb(C(xi)))\times \lambda m \quad (5)$$

Furthermore, D(xi) defined by Expression (6) below represents distance values of the pixels xi in intermediate-axis distance image, and T(xi, xj) defined by Expression (7) below represents energies which are proportional to color differences of adjacent pixels (xi, xj).

$$D(xi)=\text{dist}(xi)\times \lambda d \quad (6)$$

$$T(xi,xj)=\exp(-|C(xi)-C(xj)|^2)\times \lambda t \quad (7)$$

Here, Pf(C) in Expression (5) represents a likelihood of a color C which is presumed in accordance with the color distribution model of the object. The color distribution model Pf(C) is obtained, for example, using a Gaussian mixture model or kernel density estimation. Object candidate pixels having values other than 0 in the binary image are sampled to constitute the object color distribution Pf(C). Pb(C) represents a likelihood of the color C which is presumed in accordance with the background color distribution model. Similarly to the object model Pf(C), the color distribution model Pb(C) is obtained using Gaussian mixture model or kernel density estimation is utilized. Background pixels having values of 0 in the binary image are sampled to constitute the object color distribution Pb(C).

The object candidate pixels are used for a color distribution model calculation by multiplying weights W(xi) of the individual pixels. For example, when the color distribution model Pf(C) is a Gaussian mixture model, a weighted average and a weighted dispersion define the Gaussian mixture model. When all the weights W(xi) of the pixels are 1, all samples are evenly evaluated, and accordingly, a normal average and a normal dispersion are obtained.

Here, Pf(xi) in Expression (5) denotes a probability distribution model obtained by weighting pixel colors C(xi) by the weights W(xi). The weights W(xi) for individual pixels are obtained using distances dist(xi) which are values of pixels included in the distance image. For example, the weights W(xi) may be directly used as distances dist(xi) as represented by Expression (8) below or may be used after being subjected to a dist(xi)-threshold-value process. Furthermore, when the threshold-value process is performed, the weights W(xi) are 1 when the distances dist(xi) are larger than a threshold value Th and otherwise the weights W(xi) are 0. For example, when the threshold value Th is 0.9, only weights of pixels in the vicinity of an axis of the intermediate axis image are 1, and the background pixels are prevented from being subjected to sampling when the color distribution model of the object is constituted.

$$W(xi)=\text{dist}(xi)$$

or $$W(xi)=1(\text{dist}(xi)\geq Th)$$

$$0(\text{dist}(xi)<TH) \quad (8)$$

Note that λm, λd, and λt are mixture parameters used to control strength levels of the elements and ranges thereof are from 0.0 to 1.0.

In step S15, the mask-image generation unit 26 generates a weighting graph using the energy E(X) of the input image supplied from the energy calculation unit 25, generates a mask image by an optimization calculation, and outputs the mask image to the mask-image output determination unit 27. As the optimization calculation, a graph-cut method disclosed in U.S. Pat. No. 7,660,463 may be used. Furthermore, to generate the weighting graph, nodes of the graph are set using the term E__1(xi) shown in Expression (2) and edges of the graph are set using the term E__2(xi) shown in Expression (3). Note that a method for constituting the graph and an energy minimization calculation using the graph-cut method are described in U.S. Pat. No. 7,660,463 in detail.

In step S16, the mask-image output determination unit 27 determines whether the process of obtaining a mask image is performed again in accordance with the supplied mask image. More specifically, the mask-image output determination unit 27 causes the mask-image storage unit 28 to store the supplied mask image, reads a preceding mask image which has been stored, and compares the preceding mask image with the currently-supplied mask image so as to obtain a degree of matching. When the degree of matching is lower than a predetermined threshold value, it is determined that the process of obtaining a mask image is performed again, and the process proceeds to step S17. Here, the degree of matching corresponds to a rate of the number of pixels having pixel values which match the corresponding pixel values in the two mask images to the number of all the pixels.

In step S17, the mask-image output determination unit 27 transmits the supplied mask image to the distance-image generation unit 24 instead of the binary image supplied from the binary-image generation unit 23. Specifically, the process from step S13 to step S17 is repeatedly performed until it is determined that the degree of matching between the currently-supplied mask image and the previously-stored mask image is high. Then, in step S16, when it is determined that the degree of matching is sufficiently high, and therefore, the process is not to be performed again, the process proceeds to step S18.

In step S18, the mask-image output determination unit 27 transmits the mask image supplied from the mask-image generation unit 26 to the mask-image output unit 29 where the mask image is output as a result of the segmentation process.

Note that, although the case where the process is repeatedly performed until the degree of matching becomes higher than the predetermined threshold value by comparing the currently-supplied mask image with the previously-stored mask image has been described in the foregoing description, the determination as to whether the process is performed again may be made using another method. For example, the process may be repeatedly performed the predetermined number of times or the process may not be repeatedly performed, that is, the process may be performed only once.

Distance-Image Generation Process

Next, the distance-image generation process performed by the distance-image generation unit 24 shown in FIG. 3 will be described.

In step S21, the intermediate-axis-image generation unit 51 included in the distance-image generation unit 24 generates an intermediate-axis image having an intermediate axis included in a range enclosed by the input closed curve using the input binary image and supplies the intermediate-axis image to the first-distance-image generation unit 52 and the second-distance-image generation unit 53. More specifically, the intermediate-axis-image generation unit 51 executes a thinning process on a region which includes pixels having values of 128 and which is enclosed by the input closed curve in the binary image represented by the image P12 shown in FIG. 5, for example, so as to generate an image having the intermediate axis represented by an image P13 shown in FIG. 5. As a method for the thinning process, a method proposed in "Fully Parallel Thinning Algorithms Based on Ronse's Sufficient Conditions for Topology Preservation. In Progress in Combinatorial Image Analysis, pages 183-194, 2009. Research Publishing" may be used, for example. In this method, the thinning process is performed such that it is determined whether states of regions in the vicinity of the pixels which are included in the binary image and which are to be subjected to the thinning process satisfy a predetermined condition and phases and characteristics in shape remain when the pixels are deleted. After the image P12 shown in FIG. 5 is subjected to the thinning process, the image P13 which is the intermediate-axis image including a thin line representing the characteristics in shape of the region enclosed by the input closed curve L1 is obtained. The image P13 which is the intermediate-axis image represents the shape of the input closed curve L1 included in the image P12 which is the binary image as a plurality of polygonal lines.

In step S22, using the intermediate axis image, the first-distance-image generation unit 52 performs, for individual pixels, cumulative addition to obtain distances of pairs of adjacent pixels in paths which are shortest paths connecting pixels in a boundary which is the input closed curve and pixels included in the intermediate axis serving as a reference to each other. Then, the first-distance-image generation unit 52 supplies an image having pixel values corresponding to the obtained distances of the pixels as a first distance image to the normalized-distance-image generation unit 54.

More specifically, the first-distance-image generation unit 52 calculates the distances to the pixels using a fast marching method or the like. Values to be added to obtain the distances may be obtained in accordance with fixed value distances in which 1 is added as a pixel is shifted from one to another, adjacent distances in which adjacent relationships are considered such that 1 is added in a vertical direction and $\sqrt{2}$ is added in a diagonal direction, or color difference distances based on differences of colors and luminance between pixels in certain positions and adjacent pixels.

Furthermore, as a detailed distance calculation method, values obtained by integrating differences of likelihoods may be used as the distances. Furthermore, for example, the distance calculation method may be realized by using the likelihoods M(xi) based on the colors of the pixels represented in Expression (5) described above. In this case, since it is expected that likelihoods are considerably changed in the boundary between the object and the background, the distances are considerably changed in portions corresponding to the boundary, and it is expected that the object and the background may be appropriately separated from each other with ease.

Furthermore, as a more reliable method, a method for obtaining pixels which have pixel values of 0, which are spatially located in the shortest distances from the pixels having the pixel values of 128 included in the binary image, successively calculating Euclidean distances, and supplying the distances has been proposed.

In step S23, using the intermediate axis image, the second-distance-image generation unit 53 performs, for individual pixels, cumulative addition to obtain distances of pairs of adjacent pixels in paths which are shortest paths connecting the pixels included in the intermediate axis serving as the reference and the pixels in the boundary which is the input closed curve to each other. Then, the second-distance-image generation unit 53 supplies an image having pixel values corresponding to the obtained distances of the pixels as a second distance image to the normalized-distance-image generation unit 54. Specifically, the second-distance-image generation unit 53 obtains the distances of the pixels by basically the same calculation method as that performed by the first-distance-image generation unit 52, but pixels serving as starting points and pixels serving as ending points in the integration of the distances are swapped.

In step S24, the normalized-distance-image generation unit 54 generates a normalized distance image by normalizing information on the distances of the pixels in accordance with the first and second distance images and causes the distance-image output unit 55 to output the normalized distance image as the distance image represented by the image P14 shown in FIG. 5, for example. More specifically, the normalized-distance-image generation unit 54 calculates Expression (9) below using the information on the pixel values of the pixels included in the first and second distance images to thereby normalize the distances so as to generate the normalized distance image.

$$\text{dist}(xi) = d\_1(xi)/(d\_1(xi) + d\_2(xi)) \tag{9}$$

Here, dist(xi) denotes an intermediate axis distance in a pixel xi, d_1(xi) denotes a pixel value representing a distance of the pixel xi included in the first distance image, and d_2(xi) denotes a pixel value representing a distance of the pixel xi included in the second distance image.

Since, by performing the process described above, the distance image may be calculated taking the shape of the input closed curve into consideration, the energy is obtained in accordance with the distance image, and the mask image is obtained in accordance with the information on the optimized energy, a shape of the object which is obtained as a result of the segmentation process may be controlled so as to be similar to the shape of the input closed curve and the shape of the object may be obtained taking the shape of the input closed curve, in addition to the information on the object included in the image, into consideration. Consequently, attributes which represent whether the individual pixels belong to the object (foreground) or the background may be reliably assigned to the pixels in the segmentation process.

Figure 6:
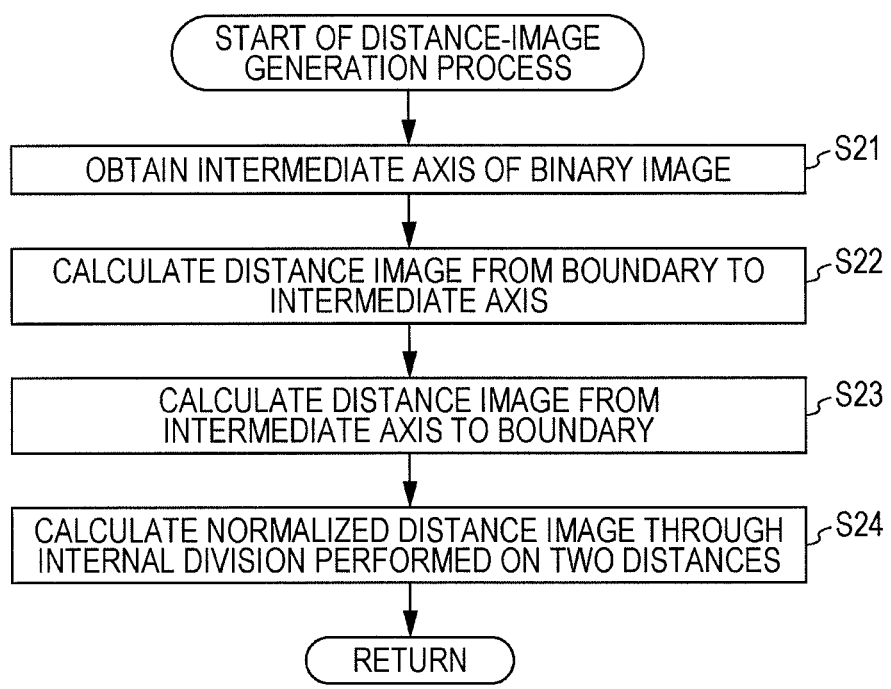
FIG. 6 is a flowchart illustrating a distance-image generation process performed by the distance image generation unit.

Here, the distance image obtained by the distance-image generation process shown in FIG. 6 may be applied to the energy calculation of a smoothing term of T(xi, xj) shown in Expression (7) above. Specifically, in the method disclosed in U.S. Pat. No. 7,660,463, only differences of adjacent colors are taken into consideration as an energy. However, distance components may be reflected in the energy using the distance image calculated by the distance-image generation process shown in FIG. 6.

As a first method, a method for changing an energy of the smoothing term in accordance with the distance value dist(xi) of the distance image may be used. Specifically, the energy is calculated in accordance with Expression (10) below.

$$T(xi, xj) = \exp(\text{MIN}(-|C(xi) - C(xj)|^2 + \alpha \times \text{dist}(xi), 0.0)) \times \lambda t \tag{10}$$

Here, MIN(a, b) denote an operator in which the smallest value between values a and b is selected. Furthermore, α denotes a parameter used to control a degree of influence of the distance component dist(xi).

In Expression (10), as the distance dist(xi) is larger and nearer the intermediate axis, the energy becomes large, and therefore, it is difficult to form a contour due to increased cost. That is, a region in the vicinity of the intermediate axis which is estimated to be included in the object is prevented from being cut, and by this, a proper contour of the object is prevented from considerably being shrunk inward.

Furthermore, as a second method in which the distance components are applied to the smoothing-term energy calculation, a method utilizing a level curve direction of the distance image may be used. More specifically, the energy is designed such that a direction along a level curve set by connecting pixels having the same distances in the distance image to one another, that is, a direction in which the distance dist(xi) is less changed among positions of the pixels, is obtained in accordance with Expression (11) below and cutting is easily performed in the direction.

$$T(xi,xj)=\exp(-|C(xi)-C(xj)|^2 \times (\beta \times |V(xi,xj) \cdot \Delta dist(xi)|)+ \epsilon) \times \lambda t \quad (11)$$

Here, β and ε denote parameters used to control the degree of influence of the direction distance component dist(xi). Furthermore, V(xi, xj) denotes a unit vector representing a direction obtained by a difference of space positions of the pixel xi and a pixel xj which are located adjacent to each other. Δdist(xi) denotes a unit vector representing a differential direction in the distance image. This is obtained by a Sobel filter, for example. When an absolute value of an inner product |V(xi, xj)·Δdist(xi)| is small, that is, when the edges orient a direction of the level curve of the distance image, the energy is made small to thereby control is performed so that the contour is easily formed. By this, it is likely to output a result of the segmentation having a contour direction the same as the input closed curve.

Second Embodiment

Another Configuration of Distance-Image Generation Unit

In the foregoing description, the case where the distance-image generation unit 24 obtains distances between pixels on an input closed curve and pixels included in an intermediate axis for individual pixels, calculates an energy in accordance with a distance image having pixel values corresponding to the distance, and generates a mask image by an optimization process has been described as an example. However, a distance image having pixel values corresponding to distances of individual pixels should be obtained after the distances from pixels in positions of a reference such as an intermediate axis to pixels on an input closed curve are defined, and therefore, the distance image may be obtained by defining the distances of the individual pixels in another way. For example, as another method for defining the distances of the individual pixels, a distance image may be generated by deforming a shape of the input closed curve into a circle having a specific position as a center by morphing and determining distances from the center to positions of the pixels obtained by the morphing as normalized distances.

Figure 7:
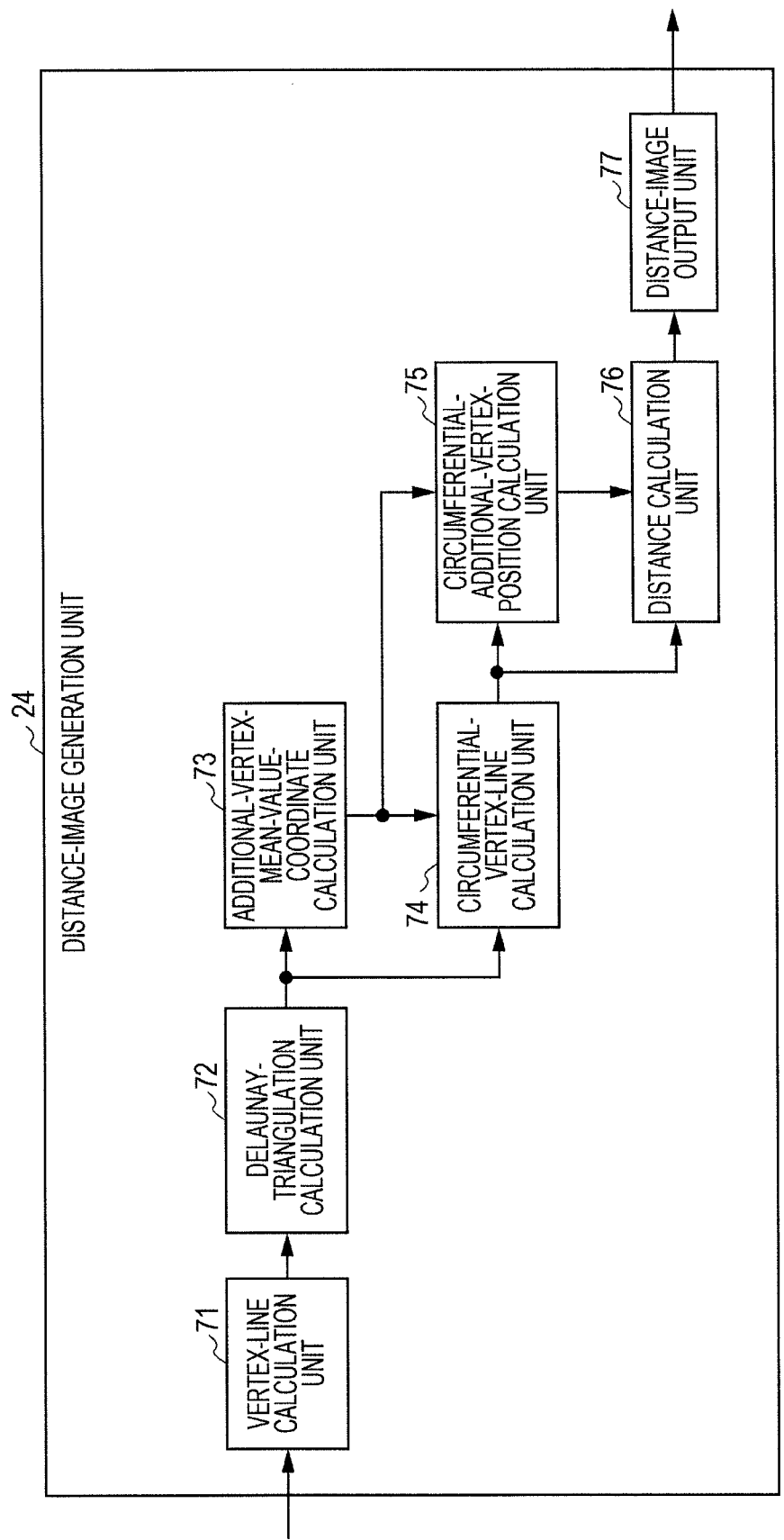
FIG. 7 is a diagram illustrating another configuration of the distance-image generation unit.

FIG. 7 shows an example of a configuration of a distance-image generation unit 24 which generates a distance image including pixel values defined by distances from a reference position which is a center of a circle obtained from a shape of an input closed curve through morphing.

The distance-image generation unit 24 shown in FIG. 7 includes a vertex-line calculation unit 71, a Delaunay-triangulation calculation unit 72, an additional-vertex-mean-value-coordinate calculation unit 73, a circumferential-vertex-line calculation unit 74, a circumferential-additional-vertex-position calculation unit 75, a distance calculation unit 76, and a distance-image output unit 77.

The vertex-line calculation unit 71 sets pixels serving as vertices on the input closed curve and supplies information on the set pixels to the Delaunay-triangulation calculation unit 72. More specifically, the vertex-line calculation unit 71 successively searches for pixels which are adjacent to each other and which have the same pixel values (for example, pixels having pixel values of 0 when an input closed curve L1 included in an image P11 shown in FIG. 5 is taken as an example) using a certain one of pixels on the input closed curve as a base point, and thins out pixels every predetermined number of pixels with substantially even intervals.

The Delaunay-triangulation calculation unit 72 successively sets Delaunay triangles using information on positions of the pixels set as the vertices provided in a constraint manner that specified pairs of vertices among a vertex line on the input closed curve are successively connected to each other so that lines defined by the pairs correspond to sides of the triangles, and supplies information on the Delaunay triangles to the additional-vertex-mean-value-coordinate calculation unit 73 and the circumferential-vertex-line calculation unit 74. Here, the Delaunay-triangulation calculation unit 72 sets an additional vertex where appropriate.

The additional-vertex-mean-value-coordinate calculation unit 73 performs calculation such that a mean value coordinate position of the additional vertex is obtained by weighting positional coordinates of the vertices in accordance with the information on the vertices supplied from the Delaunay-triangulation calculation unit 72 and supplies a resultant value to the circumferential-vertex-line calculation unit 74 and the circumferential-additional-vertex-position calculation unit 75.

The circumferential-vertex-line calculation unit 74 calculates positions to be obtained when the input closed curve is subjected to the morphing so that a circle is obtained in accordance with the vertex information supplied from the Delaunay-triangulation calculation unit 72 and the information on the mean value coordinate position of the additional vertex and supplies information on the positions to the circumferential-additional-vertex-position calculation unit 75 and the distance calculation unit 76.

The circumferential-additional-vertex-position calculation unit 75 calculates a coordinate corresponding to the mean value coordinate of the additional vertex which is moved when the vertices are subjected to the morphing to obtain the circle in accordance with information on coordinates of circumferential vertex lines supplied from the circumferential-vertex-line calculation unit 74 and the mean value coordinate of the additional vertex supplied from the additional-vertex-mean-value-coordinate calculation unit 73, and supplies the coordinates to the distance calculation unit 76.

The distance calculation unit 76 calculates distances from a center of the circle to the coordinates included in the input closed curve which are moved at the time of the morphing, generates a distance image having pixel values which correspond to results of the calculation and which are included in the input closed curve of the pixels which have not been subjected to the morphing, and supplies the generated distance image to the distance-image output unit 77 which outputs the distance image.

Distance-Image Generation Process Performed by Distance-Image Generation Unit of FIG. 7

Figure 8:
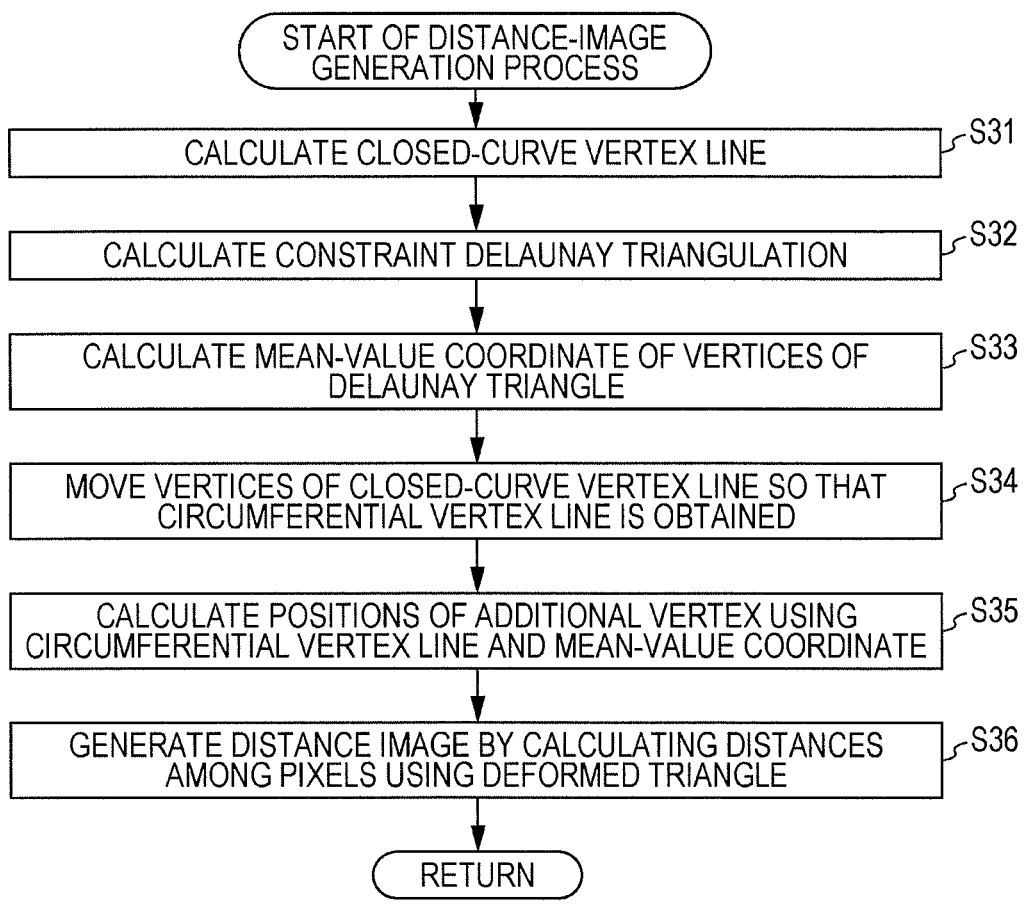
FIG. 8 is a flowchart illustrating a distance-image generation process performed by the distance-image generation unit shown in FIG. 7.

Referring now to a flowchart shown in FIG. 8, the distance-image generation process performed by the distance-image generation unit 24 shown in FIG. 7 will be described.

In step S31, the vertex-line calculation unit 71 calculates a closed-curve vertex line obtained when a closed curve included in an input-closed-curve image is approximated by polygonal lines. More specifically, when the input-closed-curve image corresponds to the image P11 shown in FIG. 5, for example, the vertex-line calculation unit 71 extracts pixels located on the input closed curve L1, thins out some pixels in a predetermined interval, and sets vertex lines. For example, when an image P31 shown in FIG. 9 is obtained, an object is represented by a star shape denoted by a solid line, and an input closed curve is set as denoted by a dotted line, the vertex-line calculation unit 71 sets vertex lines such that vertices C1 to C10 make a circle using the vertex C1 denoted by a black circle as a base point as represented by an image P33 shown in FIG. 9.

In step S32, the Delaunay-triangulation calculation unit 72 executes a Delaunay triangulation process using information on the vertex lines calculated in accordance with the input closed curve, generates a Delaunay triangle set through a calculation, and supplies the Delaunay triangle set to the additional-vertex-mean-value-coordinate calculation unit 73 and the circumferential-vertex-line calculation unit 74. A Delaunay triangle is obtained such that a circumscribed circle of a triangle does not include other vertices. The Delaunay-triangulation calculation unit 72 obtains the Delaunay triangle set as represented by an image P34 shown in FIG. 9, for example, using a Delaunay triangle algorithm in which vertex lines located on the input closed curve should be connected to one another as a constraint condition. Here, when Delaunay triangles are not obtained by division only using the set vertex lines in accordance with the Delaunay triangle algorithm having restriction, the Delaunay-triangulation calculation unit 72 adds a vertex where appropriate as represented by an additional vertex d1 denoted by a white circle in the image P34 of FIG. 9 and obtains constraint-condition Delaunay triangles by division.

Figure 9:
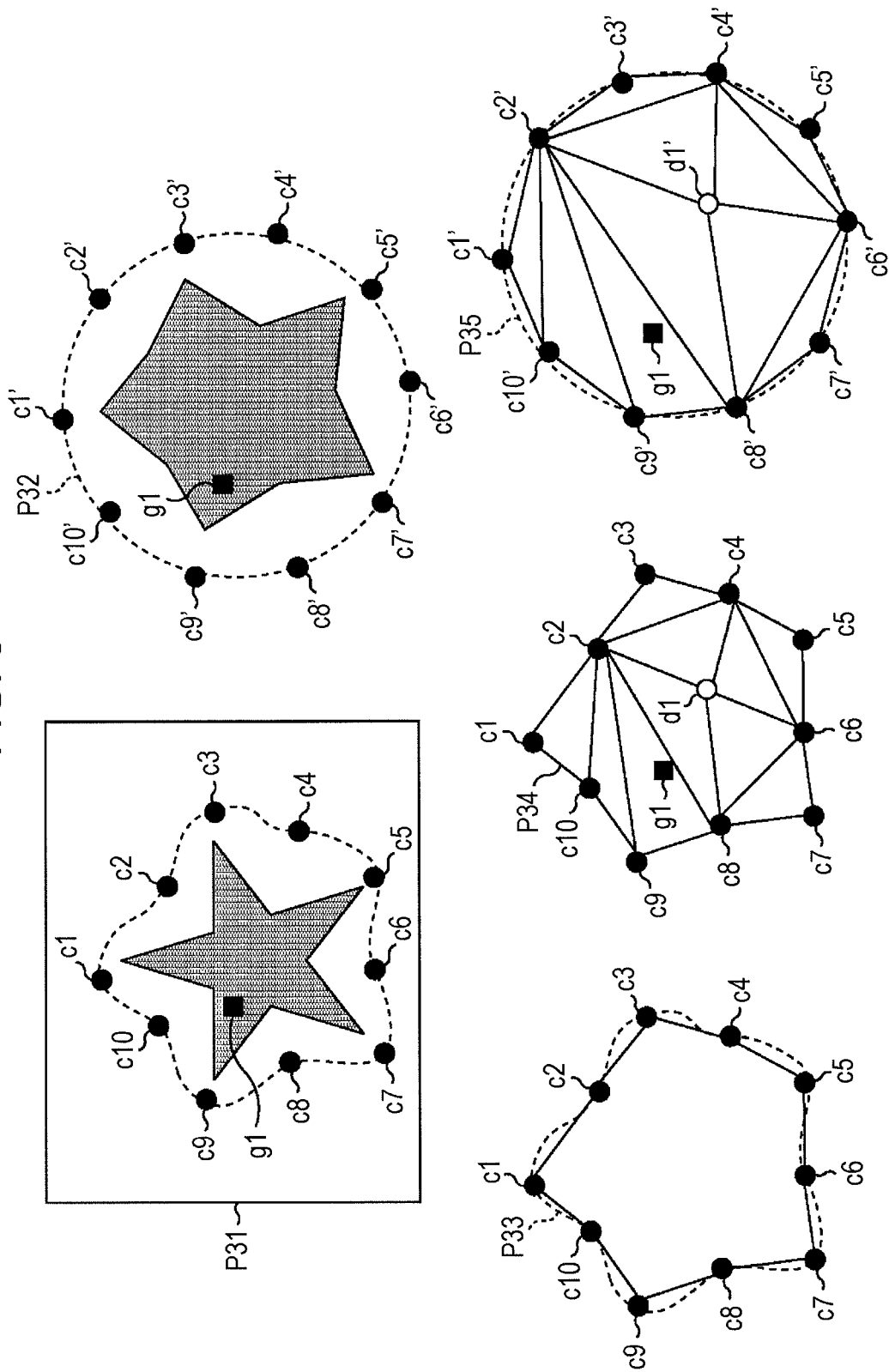
FIG. 9 includes diagrams illustrating the distance-image generation process performed by the distance-image generation unit shown in FIG. 7.

For example, when the image P34 shown in FIG. 9 is taken as an example, a triangle having the vertices c1, c2, c10, a triangle having the vertices c10, c2, and c9, a triangle having the vertices c9, c8, and c2, a triangle having the vertices c2, d1, and c8, a triangle having the vertices c6, c7 and c8, a triangle having the vertices c4, c5, and c6, a triangle having the vertices c2, c3, and c4, a triangle having the additional vertex d1 and the vertices c2 and c8, a triangle having the additional vertex d1 and the vertices c2 and c4, a triangle having the additional vertex d1 and the vertices c4 and c6, and a triangle having the additional vertex d1 and the vertices c6 and c8 are obtained through division.

In step S33, the additional-vertex-mean-value-coordinate calculation unit 73 obtains a mean value coordinate of the additional vertex of the Delaunay triangles which is added in the process in step S32 and supplies the mean value coordinate to the circumferential-vertex-line calculation unit 74 and the circumferential-additional-vertex-position calculation unit 75. More specifically, the additional-vertex-mean-value-coordinate calculation unit 73 calculates the mean value coordinate of the additional vertex as a position by performing weighted average on positions of the vertex lines on the input closed curve. Here, to obtain the mean value coordinate of the additional vertex, weights for the vertex lines on the input closed curve are calculated in accordance with a mean-value-coordinate algorithm. The additional-vertex-mean-value-coordinate calculation unit 73 calculates the mean value coordinate using the positional relationships between a vertex vx for which the mean value coordinate is to be obtained and a reference vertex line vi.

Figure 10:
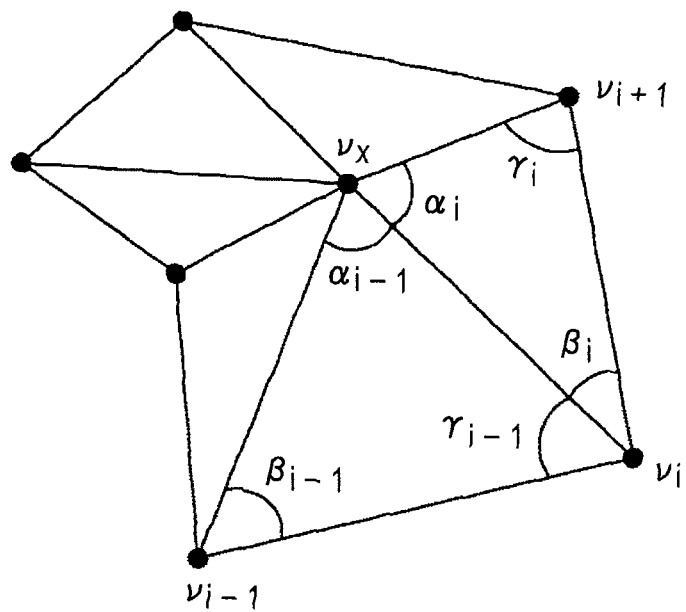
FIG. 10 is a diagram illustrating the distance-image generation process performed by the distance-image generation unit shown in FIG. 7.

More specifically, the additional-vertex-mean-value-coordinate calculation unit 73 obtains the mean value coordinate by calculating Expression (12) below using directions and angles between the additional vertex vx and the reference vertices vi and weights for the vertices vi as shown in FIG. 10.

$$v\_x = \Sigma \lambda i \times vi \tag{12}$$

Here, $\lambda i$ is defined by Expression (13) below and wi included in Expression (13) is defined by Expression (14) below.

$$\lambda_i = \frac{\omega_i}{\sum_{j=1}^{k} \omega_j} \tag{13}$$

$$\omega_i = \frac{\tan(\alpha_{i-1}/2) + \tan(\alpha_i/2)}{\|v_i - v_x\|} \tag{14}$$

Here, $\alpha i$ denotes an angle which is formed by the additional vertex vx serving as a vertex and reference vertices. Specifically, a sum of weights wi is set to be 1 and is normalized as represented by Expressions (13) and (14).

Note that a method for calculating a mean value coordinate is disclosed in detail in "FLOATER, M.S., K'OS, G., AND REIMERS, M. 2005. Mean value coordinates in 3d. Comput. Aided Geom. Des. 22, 7, 623.631".

In step S34, the circumferential-vertex-line calculation unit 74 deforms the vertex lines on the input closed curve into a circle so as to obtain circumference vertex lines and supplies the circumference vertex lines to the circumferential-additional-vertex-position calculation unit 75 and the distance calculation unit 76. More specifically, the circumferential-vertex-line calculation unit 74 virtually sets a circle having a radius of 1.0 as represented by an image P35 shown in FIG. 9 and arranges C1' to C10' of the input closed curve on a circumference in equal intervals to thereby obtain the circumferential vertex lines. That is, here, since a shape of the input closed curve is subjected to morphing so that the circle having the radium of 1.0 is obtained, coordinates of an image included in the input closed curve are also moved by the morphing.

In step S35, the circumferential-additional-vertex-position calculation unit 75 calculates a position of the additional vertex on the circle obtained after the morphing using the coordinates of the circumferential vertex lines supplied from the circumferential-vertex-line calculation unit 74 and the mean value coordinate of the additional vertex calculated by the additional-vertex-mean-value-coordinate calculation unit 73. Here, the position of the additional vertex is calculated by weighted average performed on the circumferential vertex lines corresponding to the circle obtained by the morphing using a weight of the mean value coordinate. Note that it is apparent that information on connection of Delaunay triangles remains. By the process described above, the circumferential vertex lines on the circle obtained after the morphing, the position of the additional vertex of the Delaunay triangles, and the mean value coordinate are obtained.

In step S36, the distance calculation unit 76 obtains positions of the pixels included in the input closed curve on the circle obtained after the morphing in accordance with information on the circumferential vertex lines and information on the position of the circumferential additional vertex, generates a distance image having pixel values corresponding to information on distances of the pixels obtained after the morphing, and causes the distance-image output unit 77 to output the distance image. Here, the distances of the pixels which are the pixel values of the distance image correspond to values of pixels for a shape obtained before the morphing, when it is determined that an outer circumference of the circle is 0,0 and a center thereof is 1.0 as definitions. By this operation, the pixels before being subjected to the morphing are associated to the positions of the circle obtained after the morphing one by one, distances from a center serving as a reference are set in accordance with the positions in the circle, and the distances are set as the values of the pixels obtained before being subjected to the morphing.

More specifically, when a pixel to be processed corresponds to a pixel g1, the distance calculation unit 76 performs calculation so that one of the obtained Delaunay triangle sets which includes the pixel g1 is obtained to thereby obtain a triangle t. Next, the distance calculation unit 76 obtains a center of a gravity coordinate of the pixel position g1 using positions of three vertices of the triangle t. Furthermore, in the distance calculation unit 76, when the position g1 is represented by a weighted average of the three vertices, the center of the gravity coordinate is obtained by obtaining weights w of the three. Then, the distance calculation unit 76 obtains coordinates of the vertices of a triangle t' included in the circle obtained by performing morphing on the triangle t and calculates a position g1' of the circle corresponding to the position g1 using the three weights w. Finally, the distance calculation unit 76 calculates a distance from a center of the circle to the position g1' obtained after the morphing so as to obtain a distance dist(g1) of the pixel g1.

By performing the foregoing processes, a distance image having pixel values corresponding to distances from a center of a circle obtained by converting a shape of an input closed curve to pixels included in the circle.

Note that the segmentation process performed using a distance image obtained by the morphing is the same as that described with reference to the flowchart shown in FIG. 4, and therefore, a description thereof is omitted.

As described above, by generating a distance image having pixel values corresponding to distances from reference position (an intermediate axis or a center position of a circle obtained after the morphing) included in the input closed curve in accordance with a shape of the input closed curve input so as to surround an object and calculating an energy on the bases of the distance image, attributes of pixels representing whether the individual pixels belong to the object or belong to regions other than the object are appropriately assigned to the individual pixels. As a result, a segmentation process to be performed taking, in addition to characteristics of an image of the object included in an input image, information on the shape of the input closed curve into consideration may be realized, and accuracy of a process of specifying the object in the segmentation process is improved.

Here, a series of the processes described above may be executed by hardware or software. When the series of the processes are to be executed by software, programs included in the software are installed from a recording medium into a computer incorporated in dedicated hardware or a general personal computer capable of executing various functions by installing various programs.

Figure 11:
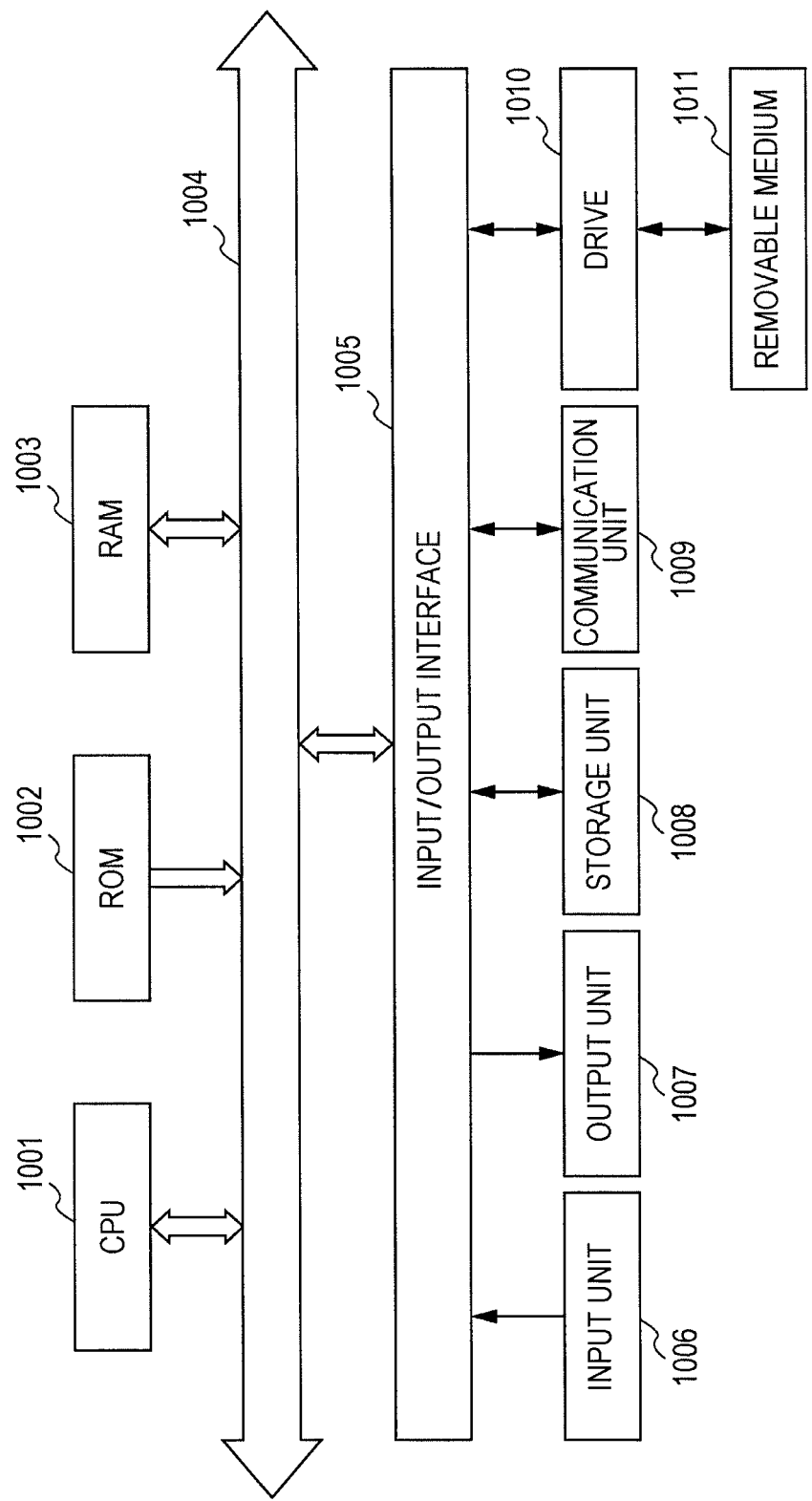
FIG. 11 is a diagram illustrating a configuration of a general personal computer.

FIG. 11 shows an example of a configuration of a general personal computer. The personal computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including input devices such as a keyboard and a mouse which are used by a user to input an operation command, an output unit 1007 which outputs a process operation screen and an image which is a processing result to a display device, a storage unit 1008 including a hard disk drive which stores programs and various data, and a communication unit 1009 which includes a LAN (Local Area Network) adapter and which executes a communication process through a network such as the Internet are connected to the input/output interface 1005. Furthermore, a drive 1010 which reads data from and writes data to a removable medium 1011 such as a magnetic disk (including a flexible disk), an optical disk (including CD-ROM (Compact Disc-Read Only Memory) and a DVD (Digital Versatile Disc)), an magneto-optical disc (including MD (Mini Disc)), or a semiconductor memory is connected to the input/output interface 1005.

The CPU 1001 performs various processes in accordance with the programs stored in the ROM 1002 or the programs which are read from the removable medium 1011 such as a magnetic disk, an optical disc, a magneto-optical disc, or a semiconductor memory, which are installed in the storage unit 1008, and which are loaded from the storage unit 1008 to the RAM 1003. The RAM 1003 further stores data used when the CPU 1001 executes various processes where appropriate.

Note that, in this specification, steps of describing the programs recorded in a recording medium apparently include a process performed in a time-series manner along the described order, and a process executed in parallel or a process independently executed in addition to the process executed in the time-series manner.

The present disclosure contains subject matter related to that disclosed in Japanese Priority Patent Application JP 2010-166195 filed in the Japan Patent Office on Jul. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
an input-closed-curve-image obtaining unit obtaining an image including a closed curve input so as to enclose an object included in an input image;
a distance-image generation unit generating a distance image having pixel values set for individual pixels so as to correspond to distances from the input closed curve in accordance with a shape of the input closed curve;
an energy calculation unit calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image; and
a mask-image generation unit generating a mask image by performing calculation so that the input-image energy is minimized and assigning, in accordance with the minimized input-image energy, an attribute representing the object region of the input image or an attribute representing the region other than the object region.

2. The image processing apparatus according to claim 1, wherein the distance-image generation unit
obtains an intermediate axis in an inner portion relative to the input closed curve by calculation,
obtains the distances of the pixels by performing internal division on distances between the internal axis and the input closed curve relative to positions of the pixels, and
generates the distance image having the pixel values set to the individual pixels in accordance with the distances.

3. The image processing apparatus according to claim 2, wherein the distance-image generation unit calculates the intermediate axis by performing a thinning process on a shape of the inner portion of the input closed curve in a binary image obtained by performing binarization on the input image to obtain the inner portion and an outer portion.

4. The image processing apparatus according to claim 1, wherein the distance-image generation unit
performs morphing deformation on an inner portion relative to the input closed curve so that the shape of the input closed curve becomes a circle,
obtains the distances of the pixels in accordance with distances from positions to which the pixels are moved after the morphing deformation to the deformed input closed curve, and
generates the distance image having the pixel values ser for individual pixels in accordance with the distances.

5. The image processing apparatus according to claim 2, wherein the distances of the pixels included in the distance image are obtained by integrating differences of feature values associated with the pixels, the feature values including differences of luminance and colors R, G, and B and differences of the likelihoods.

6. The image processing apparatus according to claim 2, wherein the distances of the pixels included in the distance image are spatial distances on paths set between a pixel located in a reference position and pixels located in positions included in the input closed curve.

7. The image processing apparatus according to claim 1, wherein the energy calculation unit calculates the color distribution models by weighting colors of the pixels in accordance with the distances of the pixels included in the distance image and calculates the energy in accordance with the color distribution models.

8. The image processing apparatus according to claim 1, wherein the energy calculation unit increases or reduces the energy calculated using the colors of the pixels in accordance with values of the distances of the pixels included in the distance image.

9. The image processing apparatus according to claim 1, wherein the energy calculation unit increases or reduces the energy calculated using the color differences among the pixels in accordance with values of the distances of the pixels included in the distance image.

10. The image processing apparatus according to claim 1, wherein the energy calculation unit calculates orientations of the distances of the pixels included in the distance image and increases or reduces the energy in accordance with angle differences between the orientations and a direction of connection of the pixels.

11. An image processing method of an image processing apparatus including
an input-closed-curve-image obtaining unit obtaining an image including a closed curve input so as to enclose an object included in an input image,
a distance-image generation unit generating a distance image having pixel values set for individual pixels so as to correspond to distances from the input closed curve in accordance with a shape of the input closed curve,
an energy calculation unit calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and
a mask-image generation unit generating a mask image by performing calculation so that the input-image energy is minimized and assigning, in accordance with the minimized input-image energy, an attribute representing the object region of the input image or an attribute representing the region other than the object region, the image processing method comprising:
obtaining, using the input-closed-curve-image obtaining unit, an image including a closed curve input so as to enclose an object included in an input image,
generating, using the distance-image generation unit, a distance image having pixel values set for individual pixels so as to correspond to distances from the input closed curve in accordance with a shape of the input closed curve,
calculating, using the energy calculation unit, an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image, and
generating, using the mask-image generation unit, a mask image by performing calculation so that the input-image energy is minimized and assigning, in accordance with the minimized input-image energy, an attribute representing the object region of the input image or an attribute representing the region other than the object region.

12. A non-transitory computer-readable medium storing instructions, which when executed by a computer perform an image processing method comprising:
obtaining an image including a closed curve input so as to enclose an object included in an input image;
generating a distance image having pixel values set for individual pixels so as to correspond to distances from the input closed curve in accordance with a shape of the input closed curve;
calculating an input-image energy of the input image which includes a distance energy which is changed in accordance with the distances of the individual pixels or a likelihood energy which is changed in accordance with likelihoods of the individual pixels obtained on the basis of a color distribution model of a region corresponding to the object and a color distribution model of a region other than the object region in the distance image and a color energy which is changed in accordance with color differences between adjacent pixels in the distance image; and generating a mask image by performing calculation so that the input-image energy is minimized and assigning, in accordance with the minimized input-image energy, an attribute representing the object region of the input image or an attribute representing the region other than the object region.

\* \* \* \* \*